US011573713B1

(12) United States Patent
Shah et al.

(10) Patent No.: US 11,573,713 B1
(45) Date of Patent: Feb. 7, 2023

(54) IDENTIFYING AND PREVENTING INVALID MEMORY ACCESS

(71) Applicant: salesforce.com, inc., San Francisco, CA (US)

(72) Inventors: Punit B. Shah, Castro Valley, CA (US); Rui Zhang, San Francisco, CA (US); Rama K. Korlapati, El Segundo, CA (US); Prashasthi Prabhakar, San Bruno, CA (US); Dominique Jeremy Evans, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/516,833

(22) Filed: Nov. 2, 2021

(51) Int. Cl.
G06F 3/06 (2006.01)

(52) U.S. Cl.
CPC .......... G06F 3/0622 (2013.01); G06F 3/0655 (2013.01); G06F 3/0679 (2013.01)

(58) Field of Classification Search
CPC .... G06F 3/0622; G06F 3/0631; G06F 3/0655; G06F 3/0673; G06F 3/0679; G06F 12/023; G06F 12/1416; G06F 12/1441; G06F 12/145
USPC ........................................ 711/152, 163, 170
See application file for complete search history.

(56) References Cited

U.S. PATENT DOCUMENTS

| | | | | |
|---|---|---|---|---|
| 2008/0168112 | A1* | 7/2008 | Lyons | G06F 12/023 |
| 2014/0201492 | A1* | 7/2014 | Luan | G06F 3/0608 |
| | | | | 711/170 |
| 2014/0351547 | A1* | 11/2014 | Dietterich | G06F 12/0284 |
| | | | | 711/170 |
| 2020/0264976 | A1* | 8/2020 | Hoogerbrugge | G06F 12/1441 |

* cited by examiner

Primary Examiner — Gary J Portka
(74) Attorney, Agent, or Firm — Butzel Long (57) ABSTRACT

Methods, computer readable media, and devices for identifying and preventing invalid memory access. A method may include defining a dynamic scope for an operation, receiving a request to allocate a portion of the range of shared memory, allocating a monotonically increasing portion of the range of shared memory such that a subsequent request to allocate memory is allocated a different portion of the range of shared memory, receiving a request to deallocate the allocated portion of the range of shared memory, deallocating the allocated portion of the range of shared memory by protecting the deallocated portion of the range of shared memory from any subsequent access, and in response to an access of the protected deallocated portion of the range of shared memory by one of the one or more threads or processes of the operation, trapping and terminating the one thread or process.

20 Claims, 4 Drawing Sheets

IDENTIFYING AND PREVENTING INVALID MEMORY ACCESS

TECHNICAL FIELD

Embodiments disclosed herein relate to techniques and systems for identifying and preventing invalid memory access.

BACKGROUND

Memory management is a specialized area for managing a pool of memory including fulfilling requests for memory allocation and memory deallocation from software. In enterprise class software, such requests may be made concurrently from multiple threads and/or processes. Since memory is a shared resource, a risk may exist of memory corruption due to a dangling pointer, use-after-free access, memory overrun, programming errors, or the like. Such memory corruption may be manifested in a non-deterministic, arbitrary fashion, often long after a perpetrator has accessed unauthorized memory. As such, it is hard or even impossible to find a root cause and, when manifested, may generally be an innocent bystander that exhibits non-obvious and/or non-specific errors or crashes.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Embodiments disclosed herein provide techniques and systems for identifying and preventing invalid memory access.

In enterprise class software, memory allocation and deallocation requests may be made concurrently from multiple threads and/or processes of the software. Such requests may be processed by a memory management system that utilizes memory as a shared resource. That is, the same portion of memory may be assigned or otherwise allocated to two or more threads/processes at the same time. However, if one of the threads/processes manipulates the portion of memory in a way that is unexpected by the other thread/process, the portion of memory may become invalid for that other thread/process.

For example, memory block 1 may be allocated or otherwise made available to both thread 1 and thread 2. At some point, thread 1 may free or deallocate memory block 1 and memory block 1 may be allocated to thread 3. In this scenario, thread 2 may be unaware of such reallocation. If thread 2 subsequently attempts to access memory block 1, such attempt may be invalid (e.g., memory block 1 may have unexpected content) or otherwise invalidating (e.g., thread 2 may write content to memory block 1 that thread 3 doesn't expect). Since such attempt may occur at a future time relatively distant from the reallocation, it may be more difficult to identify the root cause of the invalid memory access. That is, not only may the invalid memory access negatively impact software performance, but the cause of the invalid memory access may not be readily identifiable or correctable. Although this example is based on multiple threads, this is only for simplicity and the disclosed subject matter may relate to multiple memory allocations/deallocations by a single thread.

In various implementations, invalid memory access may be identified and prevented by making use-after-free access fail on a first invalid access of memory. For example, a portion of shared memory may only be allocated once within a scope and the portion of shared memory may be protected within the scope after being deallocated.

To ensure the portion of shared memory may only be allocated once, memory addressing within the shared memory may be increased monotonically within the scope (e.g., block 1, block 2, etc.). The scope may be dynamically defined based on a particular software or operation utilizing the techniques and systems disclosed herein. In a database application, for example, a scope may be defined as an expression (e.g., sub-part of a structured query language (SQL) statement), a SQL statement, a physical operator (e.g., hash join, merge join, aggregate) transaction, a client session, or the like. By limiting address non-reuse to a dynamically defined scope, memory bloat that would otherwise result from monotonically increasing memory addressing may be avoided. That is, once an operation (i.e., scope) completes, the shared memory associated with the operation may be reclaimed and made available to another operation in which monotonically increasing addressing would restart.

In order to protect the portion of shared memory within the scope after being deallocated, memory access permissions for the portion of shared memory may be changed as part of the deallocation. For example, a deallocated portion of shared memory may have access permissions changed such that a read or write of the deallocated portion is not allowed within the scope. If another thread/process or function attempts access of the deallocated portion, that thread/process may be trapped and terminated. Such protection of deallocated memory may be achieved by operating system (OS) and/or hardware level facilities. For example, mprotect( ) may be utilized as an OS level facility to change memory access permissions. In another example, memory protection keys (MPK) may be utilized as a hardware level facility to enforce memory access permissions. If a subsequent thread/process attempts to access protected memory, the OS and hardware level facilities may result in a fault or error signal, such as a segmentation violation signal (SIGSEGV), being generated. By limiting deallocated memory protection to a dynamically defined scope, memory bloat may be avoided. That is, once an operation (i.e., scope) completes, any protections of deallocated memory may be removed and the shared memory may be made available to another operation.

Implementations of the disclosed subject matter provide methods, computer readable media, and devices for identifying and preventing invalid memory access. In various implementations, a method may include defining a dynamic scope for an operation, the dynamic scope including a range of shared memory to be utilized by the operation and the operation including one or more threads or processes, receiving a request to allocate a portion of the range of shared memory, allocating a monotonically increasing portion of the range of shared memory such that a subsequent request to allocate memory is allocated a different portion of the range of shared memory, receiving a request to deallocate the allocated portion of the range of shared memory, deallocating the allocated portion of the range of shared memory by protecting the deallocated portion of the range of shared memory from any subsequent access, and in response to an access of the protected deallocated portion of the range of shared memory by one of the one or more threads or processes of the operation, trapping and terminating the one thread or process.

In some implementations, the dynamic scope is an indication of a type of the operation.

In some implementations, the type of operation may be selected from the list including an expression, a statement, a physical operator transaction, and a client session.

In some implementations, protecting the deallocated portion of the range of shared memory from any subsequent access may include utilizing an operating system level facility to manipulate memory access permissions.

In some implementations, protecting the deallocated portion of the range of shared memory from any subsequent access may include utilizing a hardware level facility to manipulate memory access permissions.

In some implementations, trapping and terminating the one thread or process may include generating an error signal.

In various implementations, the method may further include, in response to termination of the operation, removing any protection from the range of shared memory and, for a subsequent operation having the same type of operation as the operation, defining a dynamic scope for the subsequent operation comprising the range of shared memory.

Figure 1A:
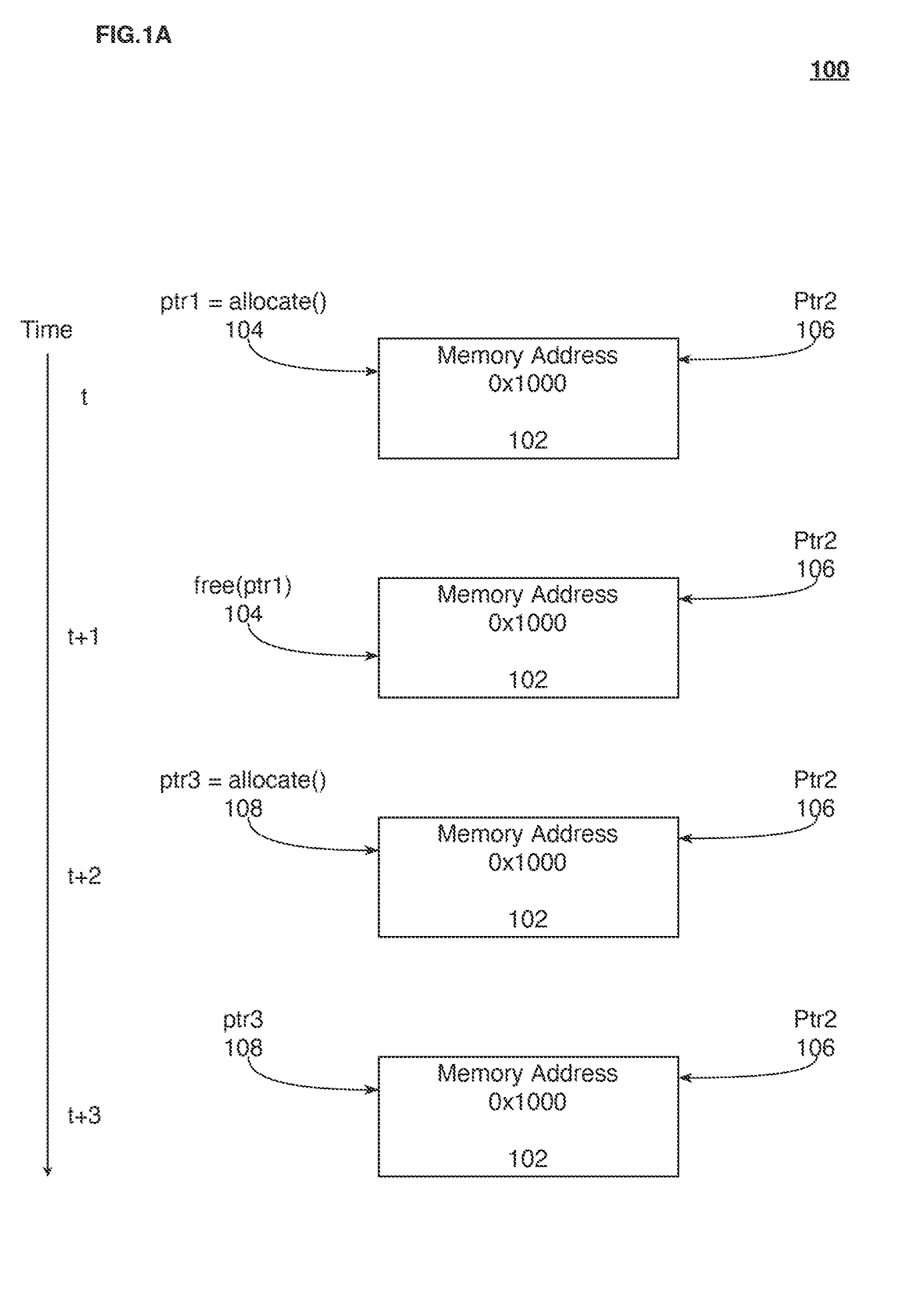
FIG. 1A is a block diagram illustrating a system of memory access over time in a traditional approach.

FIG. 1A illustrates a system 100 for memory access over time in a traditional approach. In such a traditional approach, ptr1 104 and ptr2 106 may have both been allocated the same memory address 0x1000 102 at time t. In some situations, such allocation of the same memory address to two different pointers may be intentional. For example, ptr1 104 may be part of a first thread and ptr2 106 may be part of a second thread. In this example, the first and second threads may utilize memory address 0x1000 102 in order to share data between the two threads (e.g., the first thread may write data that the second thread reads from the memory address). In other situations, such allocation of the same memory address to two different pointers may be inadvertent or unintentional.

At time t+1, ptr1 104 may free or otherwise deallocate memory address 0x1000 102. However, memory address 0x1000 102 may remain allocated to ptr2 106 and ptr2 106 may be unaware that ptr1 104 freed the memory address. In the example where two threads are using the same memory address to exchange data, the first thread may have finished executing or no longer have a need for the memory address. At this point, the memory address may or may not remain valid with respect to the second thread (i.e., ptr2 106).

At time t+2, memory address 0x1000 102 may be allocated to ptr3 108. Of note, while ptr3 108 may or may not be part of either the first or second threads, ptr3 108 is unrelated to either ptr1 104 or ptr2 106. At this point, ptr2 106 remains unaware that ptr1 104 freed the memory address and is unaware that the memory address has been allocated to ptr3 108.

At time t+3, ptr2 106 may be utilized to access memory address 0x1000 102. In the example where two threads are using the same memory address to exchange data, the second thread may attempt to read data from the memory address. However, such memory access may be invalid. For example, ptr3 108 may have been utilized to write different data in memory address 0x1000 102, in which case the second thread will have incorrect data. At this point, the second thread may exhibit or otherwise generate an error or fault, but identifying the root cause of such error or fault may be extremely difficult. Alternatively, although the second thread may have incorrect data, such incorrect data may not prompt an immediately identifiable problem. Rather, incorrect data may be "passed along" in a process that does not exhibit the problem until some relatively distant point in time, making root cause identification almost impossible.

Figure 1B:
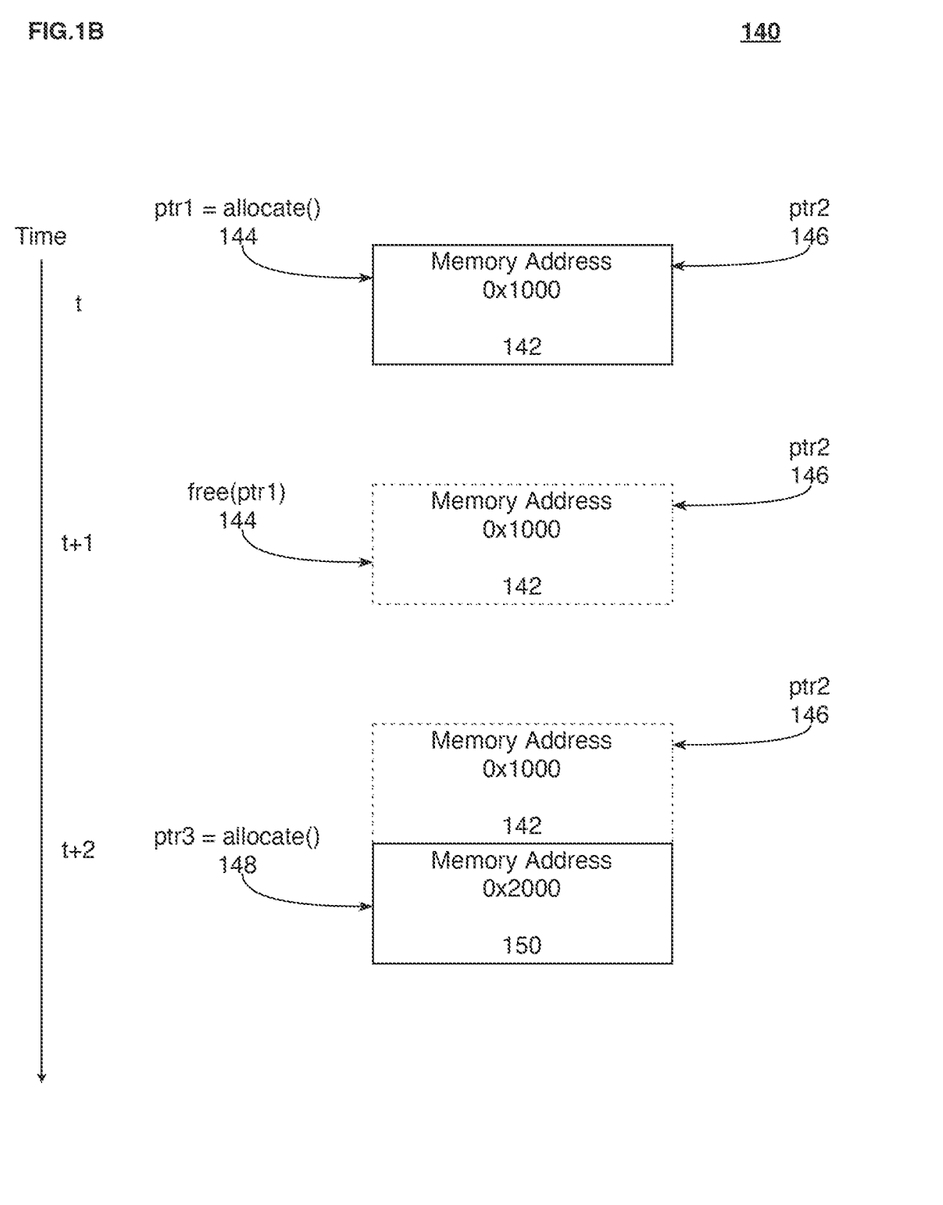
FIG. 1B is a block diagram illustrating a system for identifying and preventing invalid memory access according to some example implementations.

FIG. 1B illustrates a system 140 for identifying and preventing invalid memory access according to various implementations of the subject matter disclosed herein. In various implementations, ptr1 144 and ptr2 146 may have both been allocated memory address 0x1000 142 at time t. Memory address 0x1000 142 may, for example, be a portion of heap memory or shared memory. In some implementations, the heap memory or shared memory may be associated with an operation that includes or otherwise utilizes one or more threads or processes. The operation may, for example, be of a particular type and have an associated dynamic scope. That is, a scope of the operation may be based on and indicative of a type of the operation. Operation type may include, for example, an expression, a statement, a physical operator transaction, a client session, or the like.

At time t+1, ptr1 144 may free or otherwise deallocate memory address 0x1000 142. In various implementations, memory address 0x1000 142 may be protected as part of the deallocation process. For example, memory access permissions may be set or otherwise assigned to memory address 0x1000 142 such that the memory address will not be used again within the dynamically defined scope of the operation. In some implementations, memory access permissions may be implemented and/or manipulated by utilizing operating system (OS) level and/or hardware level facilities. For example, an OS level facility such as mprotect( ) or a hardware level facility such as memory protection keys (MPK) may be used to set and/or enforce memory access permissions. Such memory address protection is shown as dashed lines of memory address 0x1000 142 at time t+1. Based on memory access permissions, a thread and/or process that subsequently accesses memory address 0x1000 142 may be trapped and terminated by a fault or error signal, such as by a segmentation violation (SIGSEGV) signal. For example, if ptr2 146 attempts to access memory address 0x1000 142 at time t+2, the thread/process with which ptr2 146 is associated may be trapped and terminated. This may facilitate early identification of the invalid memory access by ptr2 146.

At time t+2, ptr3 148 may be allocated memory address 0x2000 150. Of note, ptr3 148 may be allocated the next available portion of memory because allocation may only occur from monotonically increasing memory blocks and memory address 0x1000 142 had already been allocated. As shown, even though memory address 0x1000 142 had previously been freed/deallocated, any new allocation within the dynamic scope of the operation would utilize a different memory address. In this way, invalid memory access may be prevented because subsequent memory allocation may only occur from a different memory address.

Although not explicitly shown in FIG. 1B, once an operation completes, any protections associated with portions of shared memory utilized by the operation may be removed and the shared memory may be made available for utilization by another operation.

Figure 2:
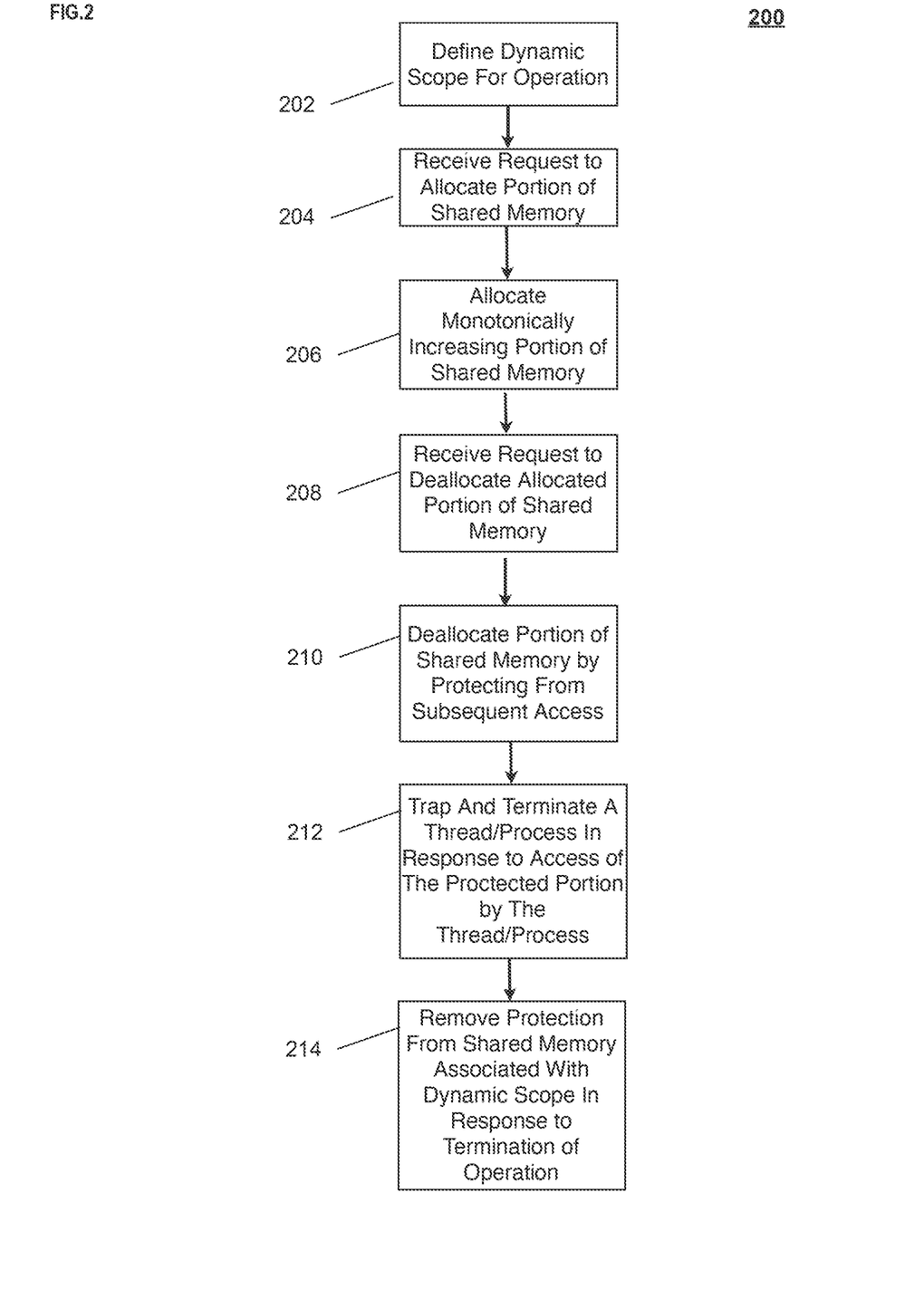
FIG. 2 is a flow diagram illustrating a method for identifying and preventing invalid memory access according to some example implementations.

FIG. 2 illustrates a method 200 for identifying and preventing memory access, as disclosed herein. In various implementations, the steps of method 200 may be performed by a server, such as electronic device 300 of FIG. 3A or system 340 of FIG. 3B, and/or by software executing on a server or distributed computing platform. Although the steps of method 200 are presented in a particular order, this is only for simplicity.

In step 202, a dynamic scope for an operation may be defined. In various implementations, a dynamic scope may be application specific. For example, in a database system, a dynamic scope may correspond to an expression (e.g., sub-part of a SQL statement), a SQL statement, a physical operator (e.g., hash join, merge join, aggregate) transaction, a client session, or the like.

In some implementations, the dynamic scope may define or otherwise include an amount or range of shared memory to be made available for the operation. That is, operations of different types may require or otherwise utilize different amounts of memory in order to complete an operation of a particular type. As such, the dynamic scope, and associated range of shared memory, is based on the type of operation.

In some implementations, an operation may include one or more threads or processes. For example, one operation may involve a single thread while another operation may involve multiple threads. A thread or process may represent, for example, an execution of processor instructions which may or may not utilize a portion of memory.

In step 204, a request to allocate a portion of shared memory may be received. In various implementations, the allocation request, for example, may be received by a memory manager of a computing system and may be received from a thread or process. For example, one thread or process of the operation for which a dynamic scope was defined in step 202 may request a portion of shared memory.

In step 206, a monotonically increasing portion of shared memory may be allocated. In various implementations, a memory manager of a computing system, for example, may make the allocation from the range of shared memory associated with the dynamic scope defined in step 202. The memory manager may, for example, make the allocation such that a subsequent request to allocate memory may be allocated a different portion of the range of shared memory. That is, the memory manager may allocate portions of the shared memory in such a fashion that any single portion may only be allocated to a single thread or process.

In step 208, a request to deallocate a previously allocated portion of memory may be received. In various implementations, the request, for example, may be received by a memory manager of a computing system and may be received from a thread or process to which a portion of memory was previously allocated.

In step 210, the previously allocated portion of memory may be deallocated. In various implementations, a memory manager of a computing system may deallocate the portion of memory. Such deallocation process may include, for example, protecting the deallocated portion of shared memory from any subsequent access. For example, the memory manager may utilize an OS level facility, such as mprotect( ), and/or a hardware level facility, such as memory protection keys (MPK), to change and/or enforce memory access permissions associated with the deallocated portion of memory.

In step 212, a thread or process may be trapped and terminated in response to an attempted access of a protected portion of memory by the thread or process. In various implementations, such invalid memory access may result, for example, in a fault or error signal being generated, such as a segmentation violation signal (SIGSEGV). For example, if a thread or process of the operation attempts to access a portion of memory that was previously deallocated and protected, then such invalid memory access may generate a SIGSEGV signal and the thread or process may be terminated.

In step 214, protection may be removed from shared memory associated with the dynamic scope in response to termination of the operation. In various implementations, in response to the operation completing or otherwise terminating, a memory manager of a computing system may remove any protections associated with portions of the shared memory utilized by the operation. For example, the shared memory associated with the dynamic scope may be reset or otherwise refreshed when the operation completes. In turn, the shared memory may then be utilized as part of another dynamic scope defined for another operation.

As disclosed herein, identification and prevention of invalid memory access may be improved. By protecting deallocated memory as part of the deallocation process, invalid access to the protected memory may be identified when the access occurs as opposed to at some distant time in the future. Such protection and early identification may facilitate root cause analysis and necessary corrections to the operation. By only allocating monotonically increasing portions of memory, a situation where a thread/process attempts an invalid memory access may be prevented. By implementing such identification and prevention within a dynamically defined scope associated with an operation and based on a type of the operation, any unnecessary excess utilization of memory may be avoided. That is, once an operation completes, the associated memory may be reused by another operation. In this way, operation of a computing system is enhanced by facilitating improved memory management.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 3A:
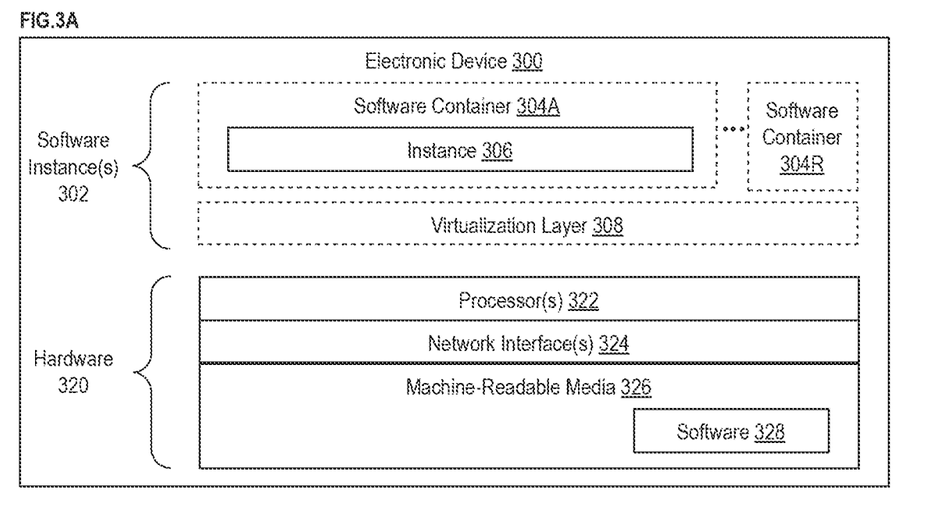
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and consolidated order manager may be implemented in one or more electronic devices 300.

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

Figure 3B:
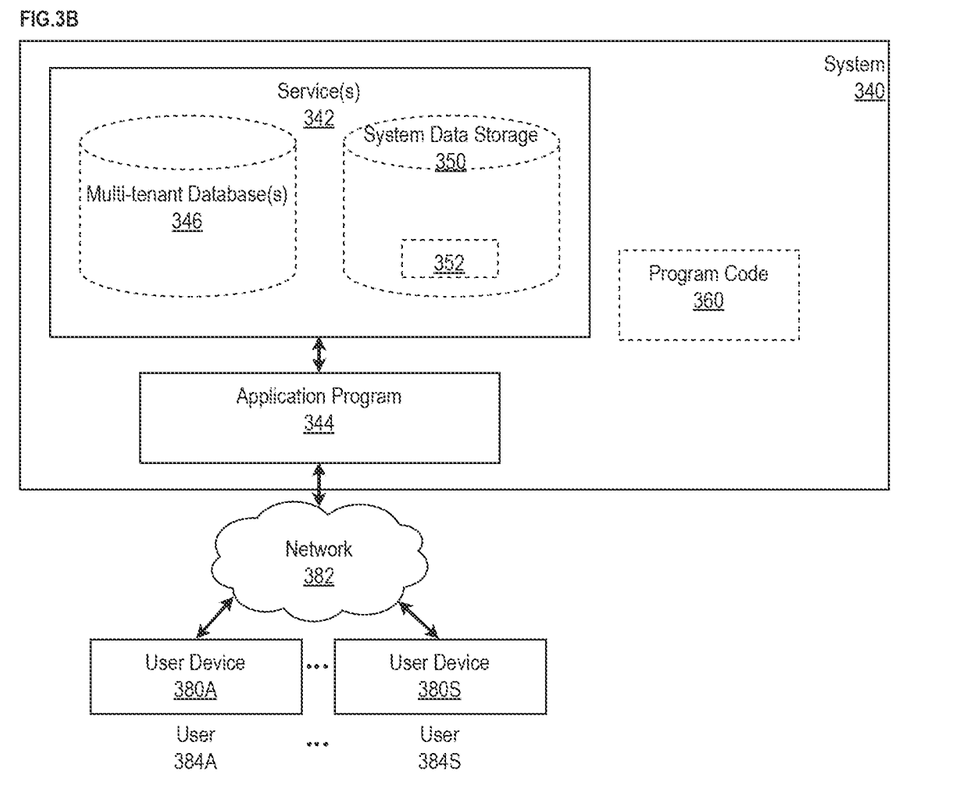
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including a consolidated order manager. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method for identifying and preventing invalid memory access, the method comprising:
   defining a dynamic scope for an operation,
      the dynamic scope comprising a range of shared memory to be utilized by the operation; and
      the operation comprising one or more threads or processes;
   receiving a request to allocate a portion of the range of shared memory;
   allocating a monotonically increasing portion of the range of shared memory such that a subsequent request to allocate memory is allocated a different portion of the range of shared memory;
   receiving a request to deallocate the allocated portion of the range of shared memory;
   deallocating the allocated portion of the range of shared memory, wherein deallocating the allocated portion comprises protecting the deallocated portion of the range of shared memory from any subsequent access; and
   in response to an access of the protected deallocated portion of the range of shared memory by one of the one or more threads or processes of the operation, trapping and terminating the one thread or process.

2. The computer-implemented method of claim 1, wherein the dynamic scope is an indication of a type of the operation.

3. The computer-implemented method of claim 2, wherein the type of operation is selected from the list comprising:
   an expression;
   a statement;
   a physical operator transaction; and
   a client session.

4. The computer-implemented method of claim 1, wherein protecting the deallocated portion of the range of shared memory from any subsequent access comprises utilizing an operating system level facility to manipulate memory access permissions.

5. The computer-implemented method of claim 1, wherein protecting the deallocated portion of the range of shared memory from any subsequent access comprises utilizing a hardware level facility to manipulate memory access permissions.

6. The computer-implemented method of claim 1, wherein trapping and terminating the one thread or process comprises generating a fault signal.

7. The computer-implemented method of claim 1, further comprising:
   in response to termination of the operation, removing any protection from the range of shared memory; and
   for a subsequent operation having the same type of operation as the operation, defining a dynamic scope for the subsequent operation comprising the range of shared memory.

8. A non-transitory machine-readable storage medium that provides instructions that, if executed by a processor, are configurable to cause the processor to perform operations comprising:
   defining a dynamic scope for an operation,
      the dynamic scope comprising a range of shared memory to be utilized by the operation; and
      the operation comprising one or more threads or processes;
   receiving a request to allocate a portion of the range of shared memory;
   allocating a monotonically increasing portion of the range of shared memory such that a subsequent request to allocate memory is allocated a different portion of the range of shared memory;
   receiving a request to deallocate the allocated portion of the range of shared memory;
   deallocating the allocated portion of the range of shared memory, wherein deallocating the allocated portion comprises protecting the deallocated portion of the range of shared memory from any subsequent access; and
   in response to an access of the protected deallocated portion of the range of shared memory by one of the one or more threads or processes of the operation, trapping and terminating the one thread or process.

9. The non-transitory machine-readable storage medium of claim 8, wherein the dynamic scope is an indication of a type of the operation.

10. The non-transitory machine-readable storage medium of claim 9, wherein the type of operation is selected from the list comprising:
    an expression;
    a statement;
    a physical operator transaction; and
    a client session.

11. The non-transitory machine-readable storage medium of claim 8, wherein protecting the deallocated portion of the range of shared memory from any subsequent access comprises utilizing an operating system level facility to manipulate memory access permissions.

12. The non-transitory machine-readable storage medium of claim 8, wherein protecting the deallocated portion of the range of shared memory from any subsequent access comprises utilizing a hardware level facility to manipulate memory access permissions.

13. The non-transitory machine-readable storage medium of claim 8, wherein trapping and terminating the one thread or process comprises generating a fault signal.

14. The non-transitory machine-readable storage medium of claim 8, wherein performed operations further comprise:
    in response to termination of the operation, removing any protection from the range of shared memory; and
    for a subsequent operation having the same type of operation as the operation, defining a dynamic scope for the subsequent operation comprising the range of shared memory.

15. An apparatus comprising:
    a processor; and
    a non-transitory machine-readable storage medium that provides instructions that, if executed by a processor, are configurable to cause the processor to perform operations comprising:

defining a dynamic scope for an operation,
   the dynamic scope comprising a range of shared memory to be utilized by the operation; and
   the operation comprising one or more threads or processes;
receiving a request to allocate a portion of the range of shared memory;
   allocating a monotonically increasing portion of the range of shared memory such that a subsequent request to allocate memory is allocated a different portion of the range of shared memory;
   receiving a request to deallocate the allocated portion of the range of shared memory;
   deallocating the allocated portion of the range of shared memory, wherein deallocating the allocated portion comprises protecting the deallocated portion of the range of shared memory from any subsequent access; and
   in response to an access of the protected deallocated portion of the range of shared memory by one of the one or more threads or processes of the operation, trapping and terminating the one thread or process.

16. The apparatus of claim 15, wherein the dynamic scope is an indication of a type of the operation.

17. The apparatus of claim 15, wherein protecting the deallocated portion of the range of shared memory from any subsequent access comprises utilizing an operating system level facility to manipulate memory access permissions.

18. The apparatus of claim 15, wherein protecting the deallocated portion of the range of shared memory from any subsequent access comprises utilizing a hardware level facility to manipulate memory access permissions.

19. The apparatus of claim 15, wherein trapping and terminating the one thread or process comprises generating a fault signal.

20. The apparatus of claim 15, wherein performed operations further comprise:
   in response to termination of the operation, removing any protection from the range of shared memory; and
   for a subsequent operation having the same type of operation as the operation, defining a dynamic scope for the subsequent operation comprising the range of shared memory.

\* \* \* \* \*